United States Patent [19]

Shimizu et al.

[11] Patent Number: 5,680,150

[45] Date of Patent: Oct. 21, 1997

[54] IMAGE PROCESSING METHOD AND APPARATUS

[75] Inventors: Yukihiko Shimizu, Yokohama; Masatoshi Okutomi, Kawasaki; Osamu Yoshizaki, Hachioji; Hiroyuki Urushiya, Tokyo, all of Japan

[73] Assignee: Canon Kabushiki Kaisha, Tokyo, Japan

[21] Appl. No.: 347,259

[22] Filed: Nov. 23, 1994

[30] Foreign Application Priority Data

Nov. 29, 1993  [JP]  Japan ................. 5-297804

[51] Int. Cl.$^6$ ................................. A61B 3/02
[52] U.S. Cl. ............... 345/115; 395/133; 395/138; 358/537; 358/538; 358/540; 364/413.19
[58] Field of Search ............... 395/100, 133, 395/135, 138; 382/9, 22, 25, 26, 27, 41, 42, 44, 45, 46, 47, 48; 358/537, 538, 539, 540; 364/413.19, 413.13; 345/115; 357/537, 538

[56] References Cited

U.S. PATENT DOCUMENTS

| | | | |
|---|---|---|---|
| 4,672,683 | 6/1987 | Matsueda | 382/57 |
| 4,737,916 | 4/1988 | Ogawa et al. | 364/443 |
| 4,759,076 | 7/1988 | Tanaka et al. | 382/46 |
| 5,022,085 | 6/1991 | Cok | 382/1 |
| 5,037,194 | 8/1991 | Kohayakawa et al. | 351/224 |
| 5,067,087 | 11/1991 | Seki et al. | 364/474.24 |
| 5,179,642 | 1/1993 | Komatsu | 395/135 |
| 5,226,098 | 7/1993 | Hirosawa | 382/61 |
| 5,263,135 | 11/1993 | Dei | 395/163 |
| 5,309,356 | 5/1994 | Nishide et al. | 364/413.19 |
| 5,325,482 | 6/1994 | Bormans | 395/161 |
| 5,394,520 | 2/1995 | Hall | 395/135 |
| 5,428,725 | 6/1995 | Sugai et al. | 395/136 |
| 5,469,274 | 11/1995 | Iwasaki et al. | 358/450 |
| 5,481,653 | 1/1996 | Kashiwagi et al. | 395/100 |

FOREIGN PATENT DOCUMENTS 0599345  6/1994  European Pat. Off. ....... G06F 15/70

OTHER PUBLICATIONS

"A Computational Vision Approach To Image Registration", Q. Zheng et al, IEEE Transactions On Image Processing, Vo. 2, No. 3, 1 Jul. 1993, pp. 311–326, X P000383916.

"An automatic Registration Method For Remotely Sensed Multispectral Images By Using Spatial Correlation Between Local Triangles", H. Hanaizumi et al., Remote Sensing: Economic Tool For The Nineties, Vancouver, Jul. 10–14, 1989, vol. 3, No. 10, Jul. 1989, Institute of Electrical and Electronic Engineers, pp. 1287–1290, XP 000139269.

"Design For a 3d Deformable Brain Atlas", S–Y Guan et al., Proceedings Of The Annual Symposium On Computer Based Medical SYSTE, Baltimore May 12–14, 1991, pp. 113–120, XP 000350660.

*Primary Examiner*—Mark R. Powell
*Assistant Examiner*—Vincent E. Kovalick
*Attorney, Agent, or Firm*—Fitzpatrick, Cella, Harper & Scinto

[57] ABSTRACT

In an image processing apparatus, a plurality of substantially corresponding points are designated on a reference image and a peripheral image. The degree of coincidence is detected between a window in the peripheral image with a corresponding point as the center, and windows successively cut from the reference image, whose center is a corresponding point. The corresponding point at the center of the window having the highest degree of coincidence in the reference image is moved and an offset between this corresponding point and the corresponding point on the peripheral image is detected. When a corresponding point whose offset is greater than a threshold exists, the peripheral image is subjected to an affine transformation using a corresponding point on the reference image whose offset is less than the threshold. The processing is repeated by using the corresponding point on the transformed peripheral image. The two images are merged by an affine transformation when the offsets of all corresponding points become smaller than the threshold.

38 Claims, 8 Drawing Sheets

FIG. 8 ial images
IMAGE PROCESSING METHOD AND APPARATUS

BACKGROUND OF THE INVENTION

This invention relates to an image processing method and apparatus for pasting together two or more images.

A prior-art image processing apparatus is available for pasting together and connecting a plurality of images at their common portions. In general, in an image processing apparatus of this kind, the operator uses a pointing device such as a mouse to designate corresponding points in an area common to two images, namely a pasted image and an image to be pasted. Affine transformation coefficients are obtained in such a manner that the designated corresponding points of both images are made to coincide, and the pasted image is subjected to an affine transformation using the obtained affine transformation coefficients.

In the above-described image processing apparatus, however, since the affine coefficients are obtained in accordance solely with the designated corresponding points, the correct affine coefficients cannot be obtained unless the corresponding points are designated accurately. Accordingly, since the operator is forced to designate accurate corresponding points, a significant burden is placed upon the operator.

SUMMARY OF THE INVENTION

An object of the present invention is to provide an image processing method and apparatus in which, when a plurality of images are pasted together, it is possible to find accurate corresponding points from designated corresponding points and obtain affine coefficients on the basis of the found corresponding points, thereby reducing the burden of the operator when the corresponding points are being designated.

Another object of the present invention is to provide an image processing method and apparatus in which, when corresponding points designated at the pasting together of a plurality of images include corresponding points whose positions are offset by a large margin, the designated points can be corrected.

A further object of the present invention is to provide an image processing method and apparatus in which it is possible to find appropriate positions of corresponding points, which have been designated on first and second images, in a prescribed zone which includes the designated corresponding points, and to correct the positions of the corresponding points, thereby making it possible to precisely paste together images.

Yet another object of the present invention is to provide an image processing method and apparatus in which it is possible to acquire, from a plurality of partial images extracted from a prescribed zone which includes a corresponding point of a first image, a partial image having the highest correlation with a peripheral image of a corresponding point, located on a second image, forming a pair with the first-mentioned corresponding point, and to correct the corresponding points on the basis of the position of this partial image.

Yet another object of the present invention is to provide an image processing method and apparatus in which an affine transformation is executed after corresponding points designated on first and second images have been moved to proper positions, thereby making it possible to readily correct corresponding points.

A further object of the present invention is to provide an image processing method and apparatus in which it is possible to execute correction of the position of a corresponding point after an affine transformation so that the search for proper corresponding points is stably achieved even if an image to be merged is rotated.

A further object of the present invention is to provide an image processing method and apparatus in which, when a pair of corresponding points exists in which the offset between the corresponding points of two images is greater than a predetermined value after an affine transformation, an affine transformation of the images is performed using a pair of corresponding points in which the offset between the corresponding points is less than the predetermined value, and the position of each corresponding point is capable of being corrected on the basis of the results of the transformation.

A further object of the present invention is to provide an image processing method and apparatus in which, when a proper position is found from corresponding points within a prescribed range of corresponding points corrected on the basis of results of executing an affine transformation using a pair of corresponding points between which the offset is less than a predetermined value, the size of the search zone is made smaller than that of the preceding cycle so that corresponding points having a small amount of offset can be detected with assurance.

A further object of the present invention is to provide an image processing method and apparatus in which, when an affine transformation is executed using a pair of corresponding points whose offset is less than a predetermined value, notification is given of the fact that the number of usable pairs is inadequate when such is the case.

A further object of the present invention is to provide an image processing method and apparatus in which, when an affine transformation is executed using a pair of corresponding points whose offset is less than a predetermined value, the predetermined value is changed and the number of usable pairs is increased if the number of usable pairs is inadequate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

An embodiment of the present invention is described in detail below with reference to the accompanying drawings In this embodiment, an example is described in which the invention is applied to an apparatus for pasting together images of the fundus of the eye. Since a retinal or ophthalmic camera has a very narrow angle of view, the amount of information obtained from a single captured image of the fundus is very small. In order to use such an ophthalmic image as an aid in diagnosis, it is necessary to paste together a number of ophthalmic images to produce a single meaningful image. When color ophthalmic images resulting from photography are pasted together using a conventional image processing apparatus, it is required that the operator provide accurate corresponding points with regard to two color ophthalmic images possessing a common area. The image processing apparatus according to this embodiment is so adapted that the burden upon the operator is lightened by reducing the exactness required of the corresponding points when a plurality of captured color images are pasted together.

Figure 1:
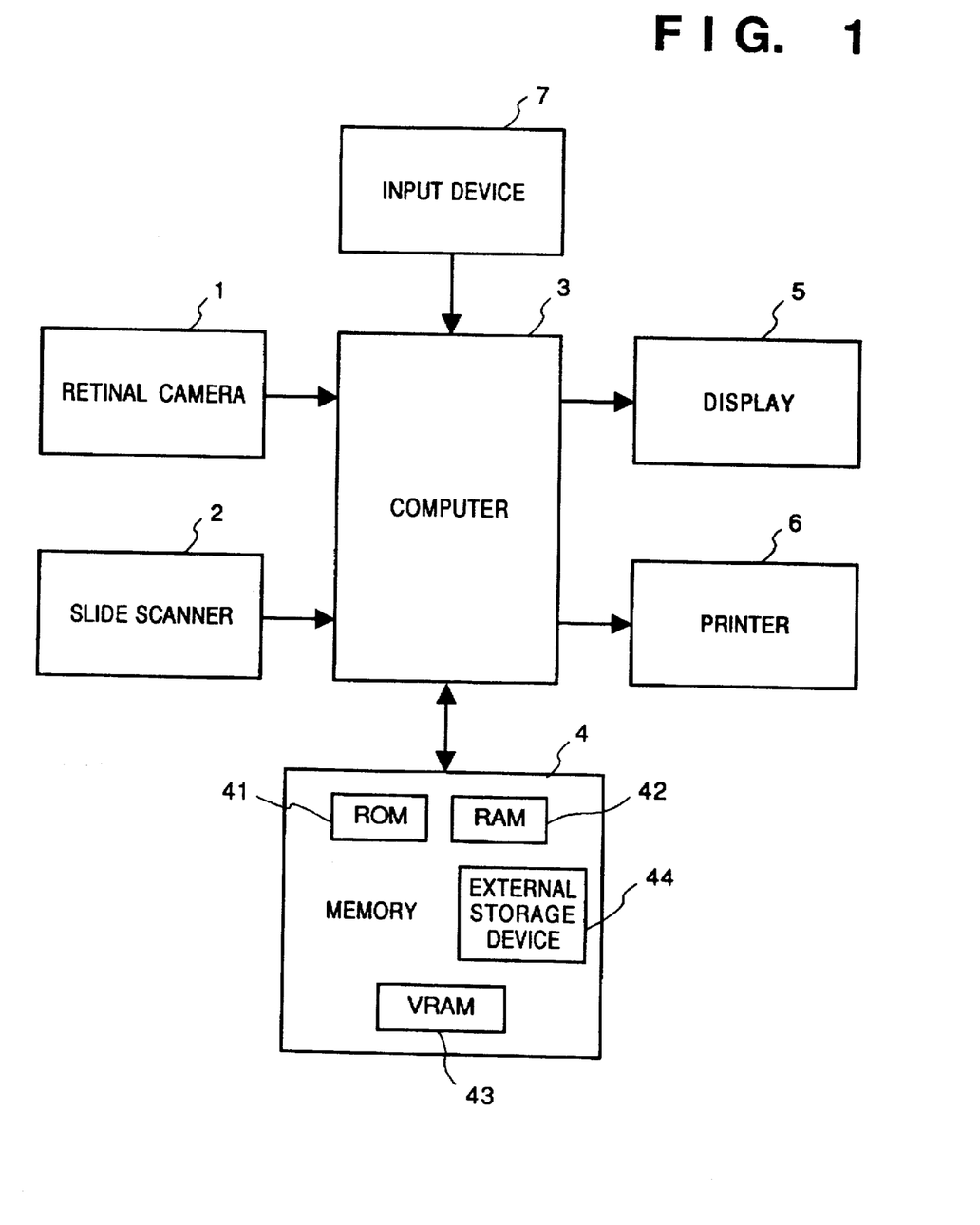
FIG. 1 is a block diagram showing the configuration of an image processing apparatus according to an embodiment of the present invention.

FIG. 1 is a block diagram illustrating the image processing system according to this embodiment, which is directed to pasting together color ophthalmic images. The apparatus includes a retinal camera 1 which performs ophthalmic photography. An ophthalmic image captured by the retinal camera 1 is converted into R, G, B digital data (eight bits per color) delivered as an output. It should be noted that the device for entering the ophthalmic image is not limited to an arrangement in which the image is inputted directly from a retinal camera. For example, the input can be made from a storage medium (an external storage device 44) such as a magnetic disk storing the image, or the images on a plurality of slides produced by photography can be entered by reading the images from a slide scanner 2. The latter is a device which reads images from a plurality of slides and outputs the images as ophthalmic images.

A computer 3 controls the overall image processing apparatus. The computer 3 is connected to a memory 4 having a ROM 41 for storing a control program in accordance with which the computer 3 executes various control operations, as well as various data, and a RAM 42 for furnishing a work area used when the computer 3 executes processing. The memory 4 further includes the aforementioned external storage device 44 so that an arrangement may be adopted in which the control program is loaded into the RAM 42 from the external storage device 44. Further, the external storage device 44 may be adapted so as to store ophthalmic images that are processed by the image processing apparatus of this embodiment. The memory 4 is further provided with a video RAM (VRAM) for storing image data indicative of an entered ophthalmic image. The computer 3 is further connected to a display 5 for displaying ophthalmic images, which have been stored in the VRAM 43, when a series of pasting operations is carried out. A printer 6 is connected to the computer 3 to print the final image resulting from pasting. The computer 3 is connected to an input device 7 constituted by a pointing device for designating corresponding points when images are pasted together, as well as a keyboard for entering various data.

A procedure for pasting together images in the image processing apparatus of the embodiment constructed as set forth above is described with reference to FIGS. 2, 4, 5A to 5C and 6A to 6C.

Figure 2:
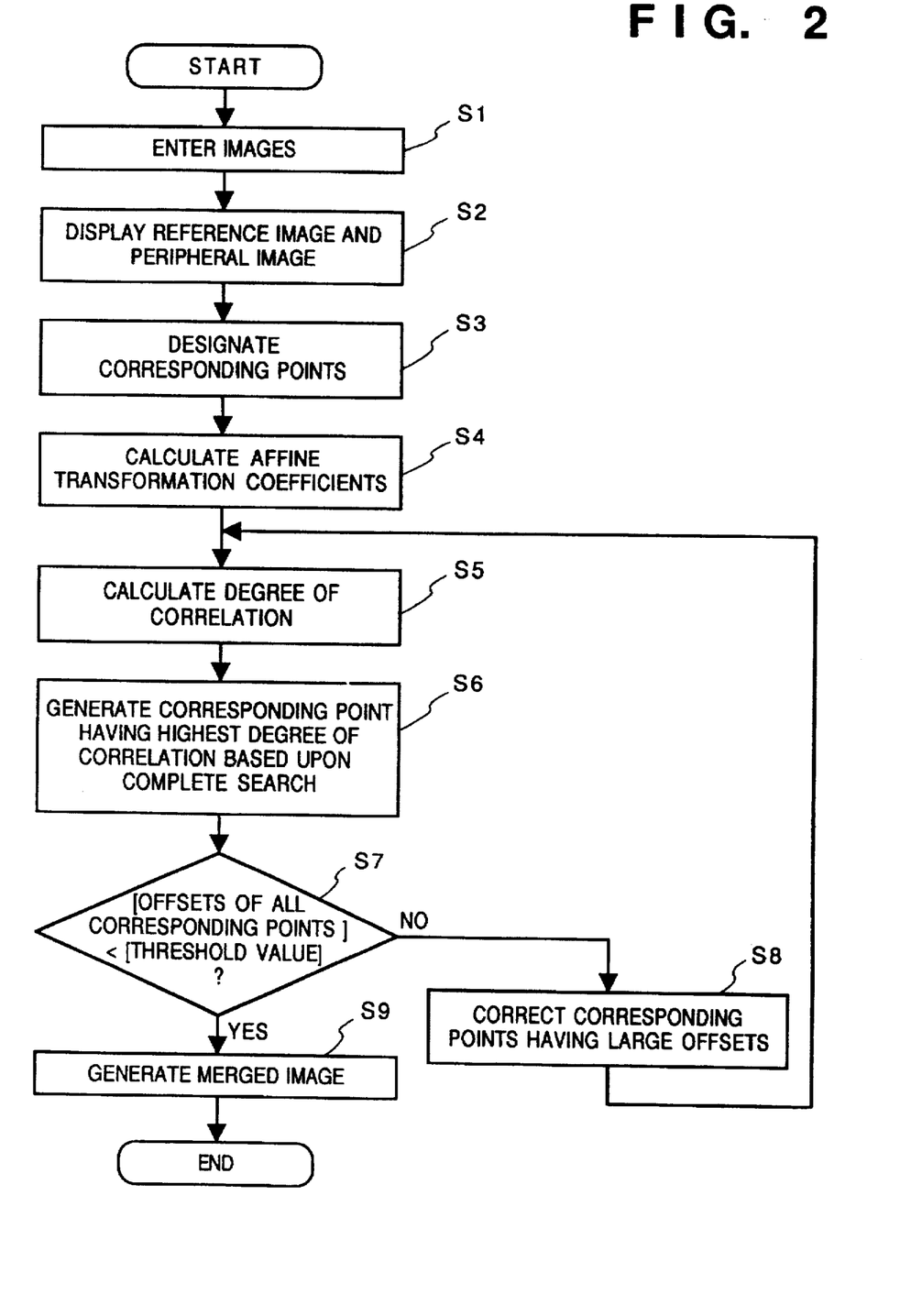
FIG. 2 is a flowchart showing a procedure for pasting images according to this embodiment.
Figure 3:
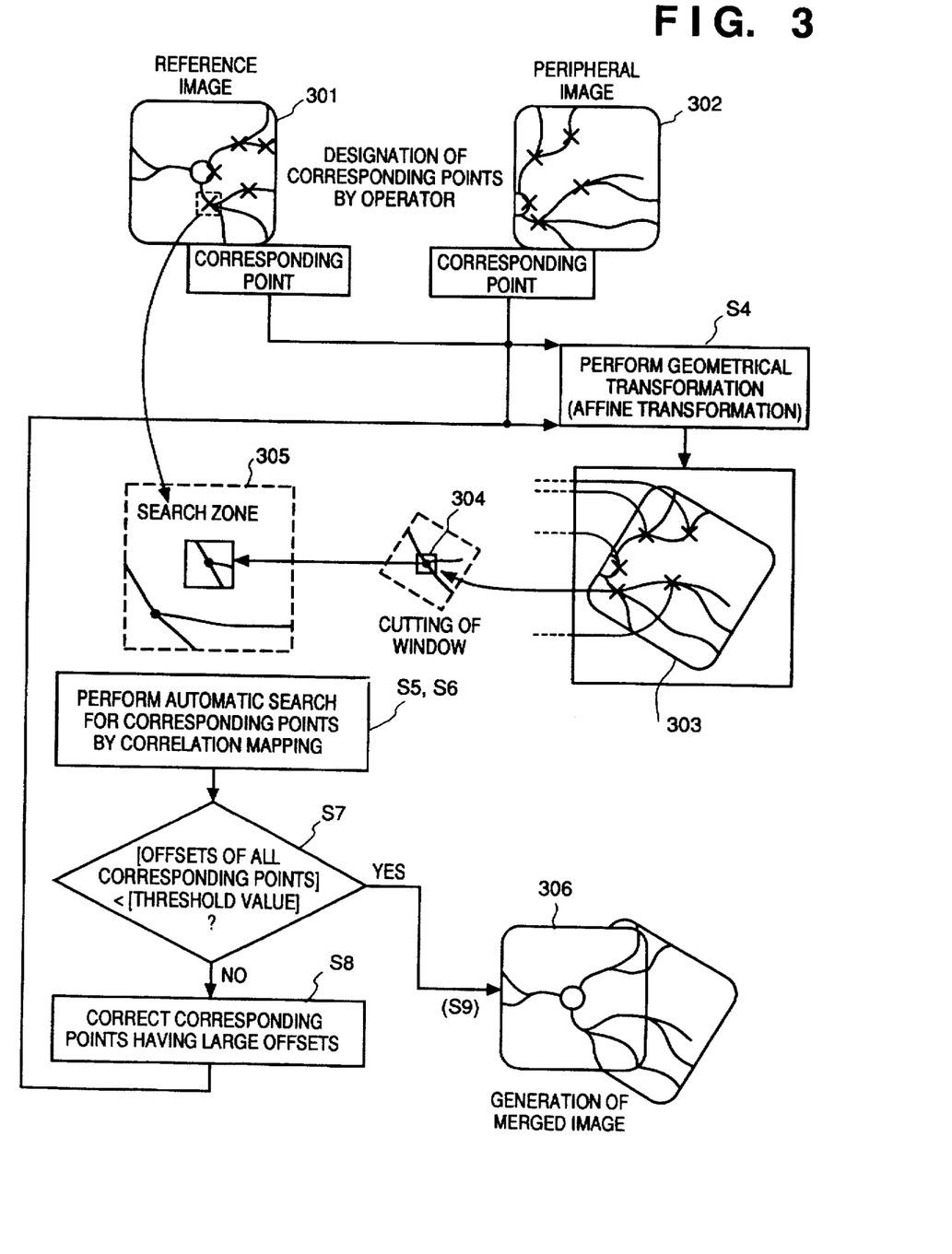
FIG. 3 is a diagram for describing an example of execution of processing for pasting together images according to this embodiment.

In the image processing apparatus of this embodiment, processing for pasting together a plurality of captured ophthalmic images is executed. FIG. 2 is a flowchart showing the procedure for pasting together images according to this embodiment. The control program for implementing control illustrated by the flowchart is stored in the ROM 41. Further, FIG. 3 is a diagram for describing an example of execution of the processing shown in the flowchart of FIG. 2. The operation of this embodiment is described below with reference to FIGS. 2 and 3.

First, at step S1, a reference image 301 and a peripheral image 302, which are images to be pasted together, are entered from the retinal camera 1 or slide scanner 2. The image data in this embodiment is R, G, B data of eight bits per color. Next, at step S2, the image data representing the two images is transferred to the VRAM 43 and displayed on the display device 5. This is followed by step S3, at which the operator uses the input device 7 (a pointing device or the like) to designate the general positions of a plurality of seemingly corresponding points (such as the branch points of blood vessels) in a common area of the two displayed images. These designated points are taken as being corresponding points and each is indicated by an "x" mark in the reference image 301 and peripheral image 302 in FIG. 3.

Next, at step S4, affine transformation coefficients are determined on the basis of the plurality of corresponding points designated on the reference image 301 and peripheral image 302, and an affine transformation is applied to the peripheral image 302 using the determined coefficients. In FIG. 3, numeral 303 denotes the peripheral image obtained as the result of the affine transformation. The program then proceeds to step S5, at which a degree of correlation is computed.

Specifically, one corresponding point is selected from the peripheral image 303 that has undergone the affine transformation, and a window 304 of a prescribed size (M pixels horizontally and L pixels vertically) centered on this corresponding point is cut from the image. A corresponding point which corresponds to the corresponding point selected from the peripheral image 303 is extracted from among the corresponding points in the reference image 301. With the corresponding point extracted from the reference image 301 serving as the center, a search zone 305 of a prescribed size is obtained in the reference image 301. A window having a size (L×M pixels) identical with that of the window 304 is successively cut from the search zone 305 and the degree of correlation c between this window and the window 304 obtained from the peripheral image 303 is acquired in accordance with the following equation, in which A (l,m) represents the data of each pixel of the window 304 and B (l,m) represents the data of each pixel of the window cut from the search zone 305 of the reference image 301:

$$c = \sum_{m=1}^{M} \sum_{l=1}^{L} \frac{[A(l,m) - \bar{a}][B(l,m) - \bar{b}]}{\sqrt{a_\sigma \cdot b_\sigma}}$$

where

-continued $$\bar{a} = \frac{1}{L \cdot M} \sum_{m=1}^{M} \sum_{l=1}^{L} A(l,m)$$

$$\bar{b} = \frac{1}{L \cdot M} \sum_{m=1}^{M} \sum_{l=1}^{L} B(l,m)$$

$$a_\sigma = \frac{1}{L \cdot M} \sum_{m=1}^{M} \sum_{l=1}^{L} \{A(l,m) - \bar{a}\}^2$$

$$b_\sigma = \frac{1}{L \cdot M} \sum_{m=1}^{M} \sum_{l=1}^{L} \{B(l,m) - \bar{b}\}^2$$

Figure 6A:
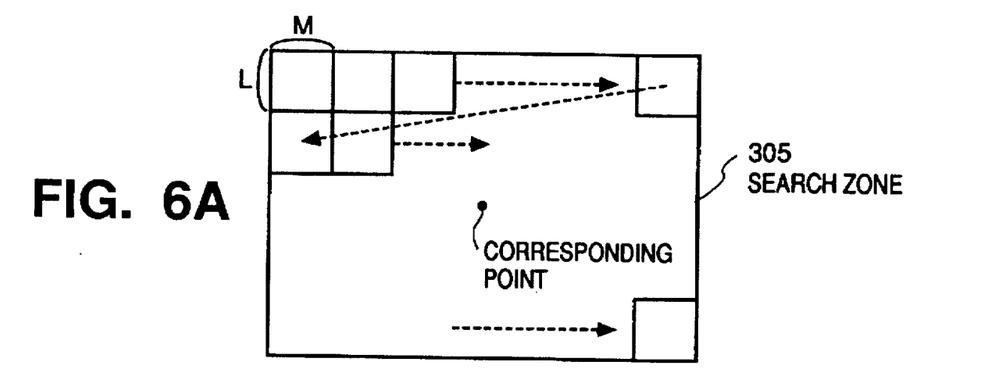
FIGS. 6A to 6C are diagrams showing examples of methods of cutting a window from a search zone.
Figure 6B:
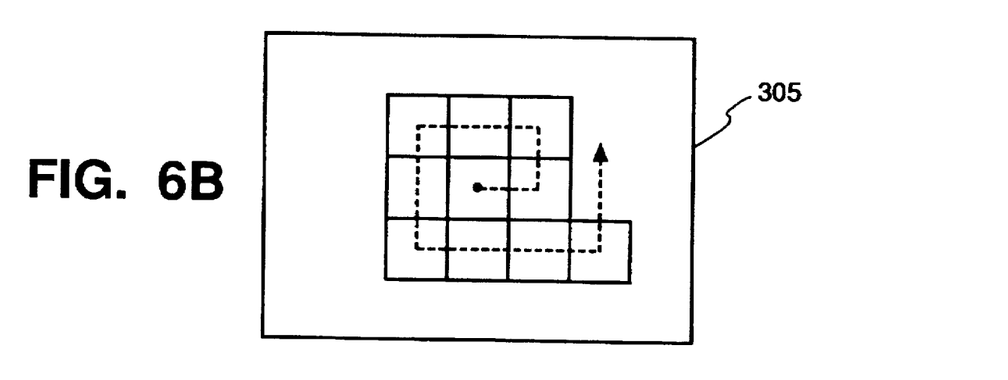
Figure 6C:
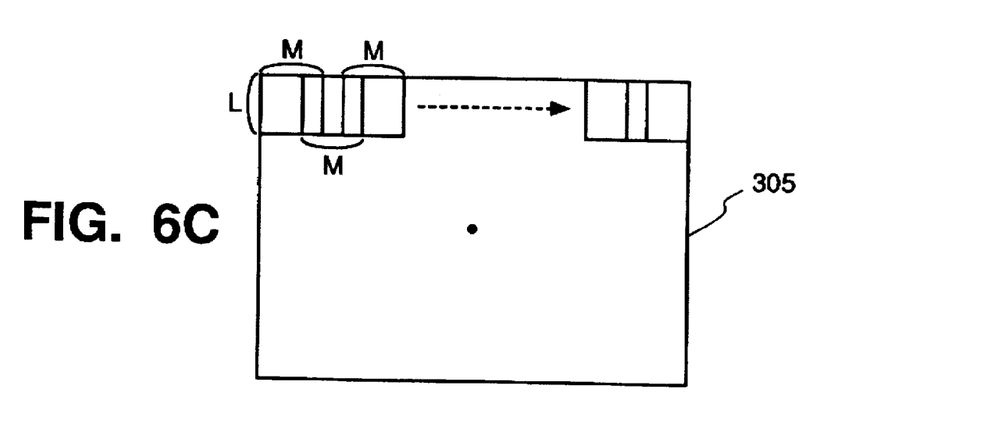

Since color image data is dealt with in this embodiment, the degree of correlation c is computed for each of the color components R, G and B and the average value is adopted as the degree of correlation. Further, various methods can be used to cut the window from the search zone 305. FIGS. 6A to 6C are diagrams showing examples of methods for cutting a window of size L×M from the search zone 305. As shown in FIG. 6A, the search zone 305 is subdivided according to the size of the window 304 to successively cut the window from the zone. Further, as shown in of FIG. 6B, the order in which the window is cut from the zone may have a spiral configuration centered on the corresponding point. As shown in FIG. 6C, the window may be cut from the zone so as to partially overlap, thus making it possible to more finely calculate the degree of correlation.

When the degrees of correlation have been computed with regard to all windows cut from the search zone 305, the program proceeds to step S6. Here the window having the highest degree of correlation among those computed at step S5 is extracted from the search zone 305. The center point of the window thus extracted is set anew as a corresponding point, on the reference image 301, which corresponds to the corresponding point at the center of the window 304. The above-described processing is executed with regard to all corresponding points designated at step S3.

Next, at step S7, a threshold value is used to evaluate the offset between each corresponding point generated anew on the reference image 301 at step S6 and each corresponding point on the peripheral image 303. In a case where the offsets of all corresponding points are less than the threshold value, the program proceeds to step S9. Here the peripheral image 302 is subjected to an affine transformation using the affine transformation coefficients generated at step S4, and the image 302 and reference image 301 are pasted together. Thus, a merged image 306 is produced.

If it is found at step S7 that the offset of any of the corresponding points is greater than the threshold value, then the program proceeds to step S8. Here affine transformation coefficients are solely determined from corresponding points whose offsets are smaller than the threshold value, and corresponding points whose offsets are larger than threshold value are corrected based upon the results. The processing of step S8 for correcting a corresponding point having a large offset will now be described in detail with reference to FIGS. 4 and 5A to 5C.

Figure 4:
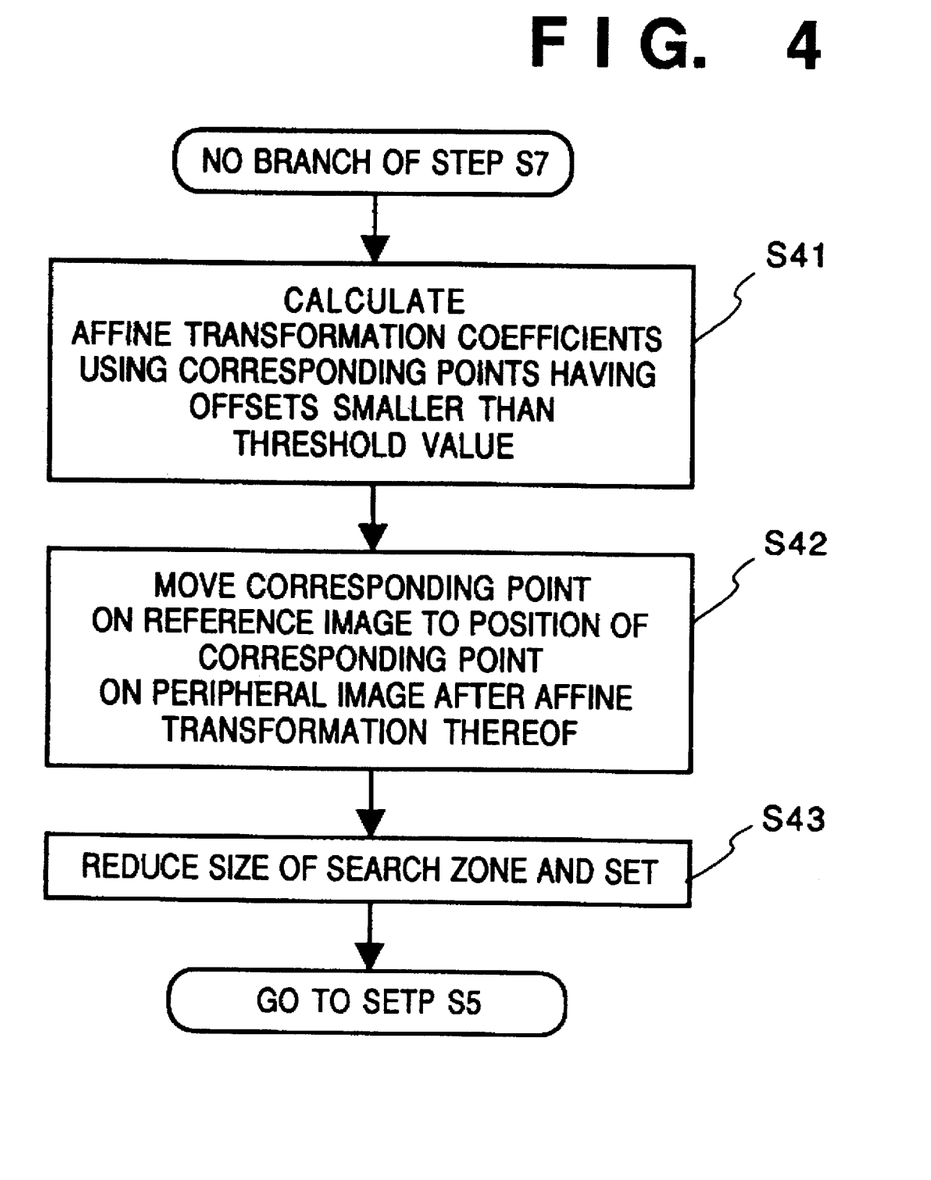
FIG. 4 is a flowchart showing a procedure of processing for correcting corresponding points having a large offset.
Figure 5A:
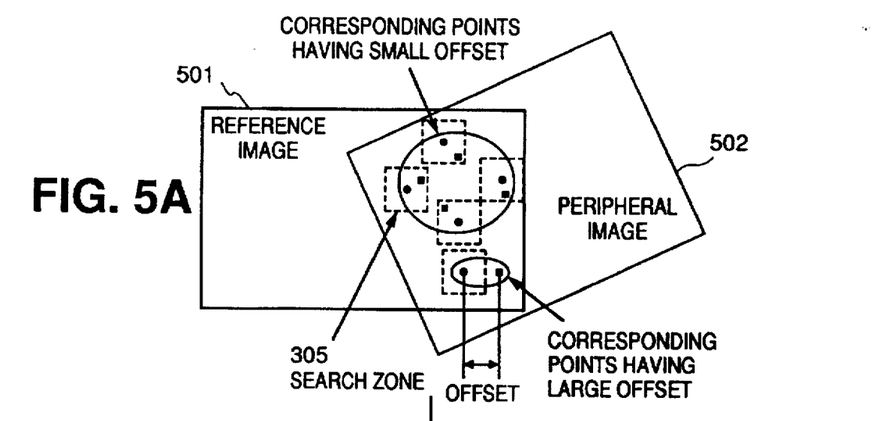
FIGS. 5A to 5C are diagrams for describing a procedure for correcting corresponding points having a large offset.
Figure 5B:
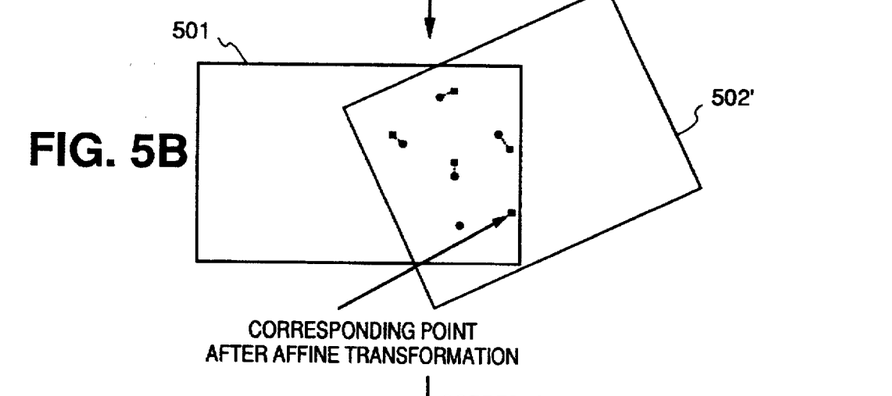
Figure 5C:
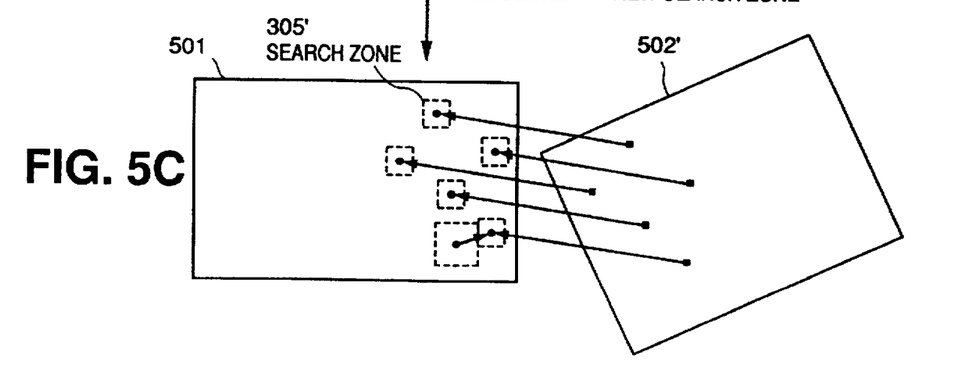

FIG. 4 is a flowchart showing the procedure of processing for correcting corresponding points having a large offset, and FIGS. 5A to 5C are diagrams for describing the procedure for correcting corresponding points having a large offset. According to this correction processing, the affine transformation is performed at step S41 using only corresponding points whose offsets are less than the threshold value employed at step S7. For example, in FIG. 5A, the affine transformation is performed using only corresponding points for which the offsets between corresponding points ● of the peripheral image 501 and the corresponding points ■ of the peripheral image are less than the threshold value, as a result of which a peripheral image 502' shown in of FIG. 5B is obtained. Next, at step S42, each corresponding point on the reference image 501 is set anew as the position of each corresponding point on the peripheral image 502'. That is, the corresponding points in the reference image 501 are moved to the positions of the corresponding points on the peripheral image 502' that has undergone the affine transformation and these points are adopted as new corresponding points. This is illustrated in FIG. 5C. It should be noted that while the positions of all corresponding points are updated in this embodiment, an arrangement may be adopted in which only the positions of corresponding points whose offsets are greater than the threshold value are updated.

Further, at step S43, a search zone 305' smaller than the search zone 305 is set anew, after which the program returns to step S5 in FIG. 2. By thus narrowing the search zone each time the processing of step S8 is repeated, a state is finally obtained in which the offsets of all corresponding points become smaller than the threshold value. As mentioned above, a merged image in which the reference image and peripheral image are pasted together is produced on the basis of the finally determined affine transformation coefficients.

In the above-described correction processing, if the number of corresponding points for which the offsets are smaller than the threshold value is less than the number necessary for performing the affine transformation, it means that the designation of corresponding points is too coarse. The operator is notified of this fact in the form of an error indication. An arrangement may be adopted in this case in which a second threshold value (which is greater than the threshold value used at step S7) is separately provided for selecting corresponding points having a small offset. Then, in a case where a sufficient number of corresponding points cannot be selected based upon the threshold value used at step S7, the selection of corresponding points is performed using the second threshold value.

Figure 8:
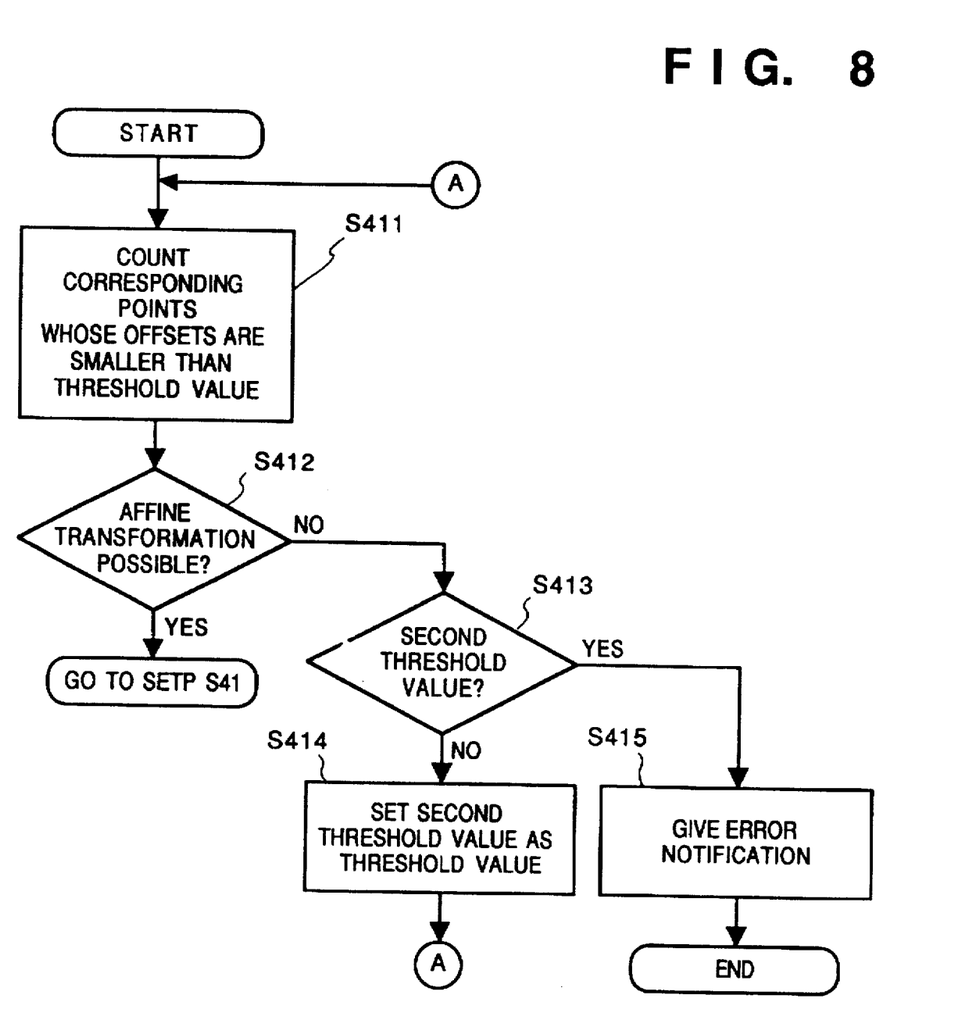
FIG. 8 is a flowchart of processing required for determining whether an affine transformation using corresponding points whose offsets are smaller than a threshold value is executable or not.

FIG. 8 is a flowchart of the processing required for determining whether the number of usable corresponding points is adequate before execution of an affine transformation using corresponding points whose offsets are smaller than a threshold value. The processing according to this flowchart is executed prior to step S41 in FIG. 4. As shown in FIG. 8, the number of corresponding points whose offsets are smaller than the threshold value are counted at step S411, after which it is determined at step S412 whether an affine transformation is possible. If the affine transformation is possible, then the program proceeds directly to step S41 in FIG. 4.

In a case where there are not enough usable corresponding points for the purpose of executing the affine transformation, the program proceeds to step S413. Here it is determined whether the threshold value is the enlarged threshold value (a second threshold value). If the threshold value is not the second threshold value, then the program proceeds to step S414, at which the second threshold value is set as the present threshold value, after which the program returns to step S411. In a case where adequate corresponding points cannot be obtained even with the second threshold value, the program proceeds from step S413 to step S415, where the operator is so notified in the form of an error indication.

In accordance with this embodiment, as described above, two or more color images can be pasted together to produce an image over a larger area in a case where only partial information is obtained with one color image owing to such limitations as the conditions of photography. In this pasting operation, the operator designates coarse corresponding points in a portion common to both color images, whereby accurate corresponding points are found so that a high-quality merged image is produced.

In a case where color images are thus pasted together, it is possible to find accurate corresponding points. As a result, the burden of the operator is greatly reduced since the operator need only roughly designate the corresponding points of the images to be pasted together. In addition, even if corresponding points having large offsets are designated, the apparatus functions so as to correct the search zone. This increases pasting precision and greatly improves operability.

In this embodiment, an example is described in which ophthalmic images are subjected to pasting processing. However, the invention is not limited to this embodiment and processing for pasting together ordinary color images can be applied as is. Furthermore, though the embodiment described deals with the pasting of color images, it goes without saying that the above-described processing is applicable to multivalued and two-valued monochromatic images. In such case the computation of degree of correlation need be performed for only one color.

Figure 7:
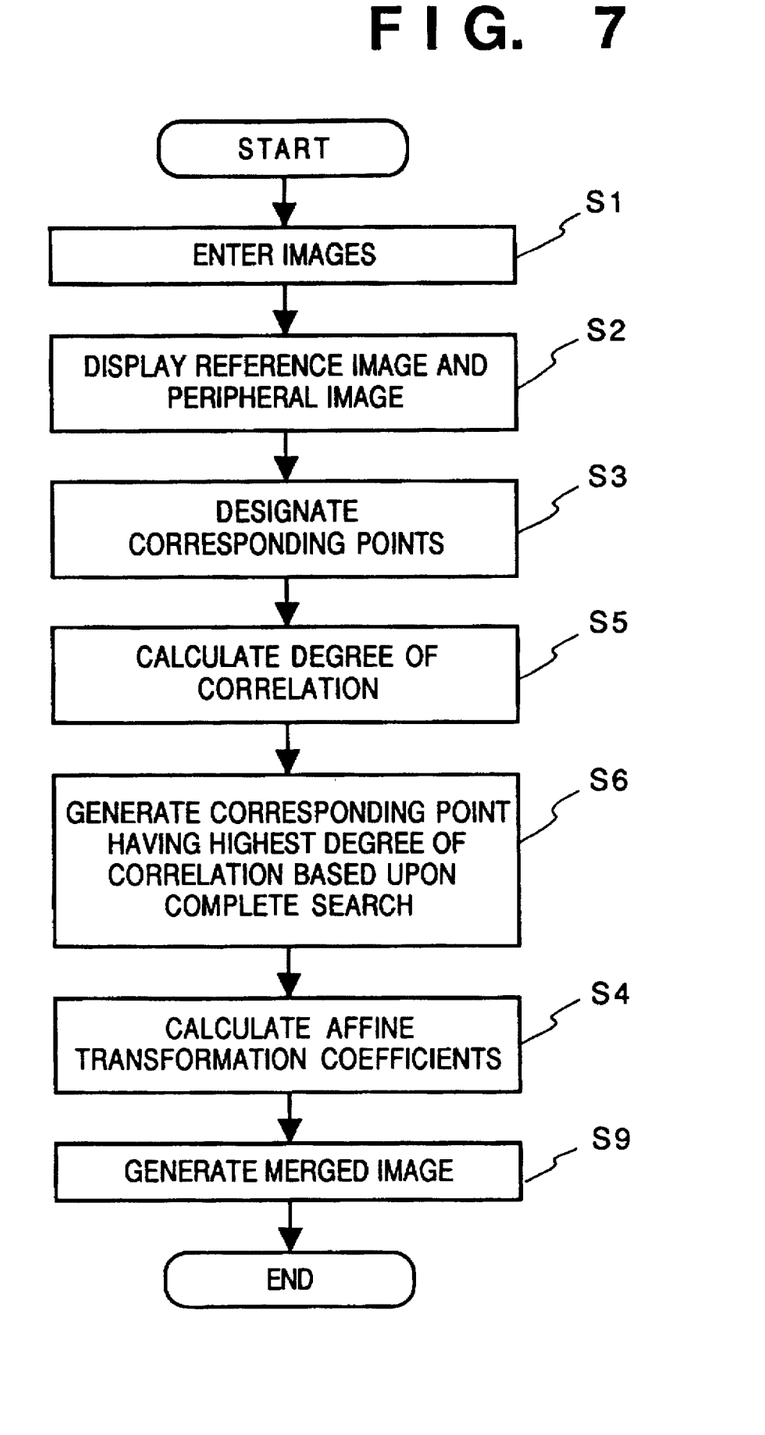
FIG. 7 is a flowchart showing an example of a modification of the processing procedure of this embodiment.

Various modifications for the foregoing embodiment may be obtained on the basis of the concept of the present invention. For example, as shown in FIG. 7, processing can be simplified by eliminating the correction of corresponding points having large offsets. Further, the affine transformation is executed after updating of position, based upon degree of correlation, of each corresponding point on the reference image 301. Processing (steps S7, S8 in FIG. 2) relating to corresponding points having large offsets is not executed. In another example of a modification, it is possible to move the affine transformation indicated at step S4 in the flowchart of FIG. 2 to the YES branch point of step S7.

In accordance with the procedure of the foregoing modifications, the positional correction of corresponding points is not carried out in a case where the corresponding points have been designated with offsets that are excessively large. Hence, there is the possibility that the precision of image pasting will decline. However, the positions of suitable corresponding points are searched for within the above-mentioned search zone. Therefore, if the precision with which the corresponding points are designated is assured to a certain extent, accurate pasting processing is possible with a simple arrangement. It will suffice if the precision with which corresponding points are designated is such that suitable corresponding points reside within the search zone. In other words, if the search zone is made large, the allowable range is enlarged with regard to designation precision, though this will increase the amount of processing necessary for computing the degree of correlation.

Further, in accordance with the procedure of the foregoing modifications, the search for corresponding points is performed before the affine transformation. Consequently, if two images to be merged are rotated by a large amount, the search for suitable corresponding points within the search zone may be impeded. The reason for this is that the degree of correlation c is inaccurate because the window image cut from the peripheral image is rotated relative to the partial image cut from the search zone. However, in a case where the rotation of the two images to be merged is small, or in a case where it is assured by the mechanism of the imaging system that the two images will undergo translational motion, highly precise pasting together of the images is possible without hindrance. It should be noted that if two images to be merged undergo translational motion, merging of the images is possible using one set of corresponding points.

It goes without saying that the search for suitable corresponding points may be executed after the affine transformation, and that an arrangement may be adopted in which the affine transformation is again executed using suitable corresponding points after these corresponding points have been obtained.

In accordance with the present invention, as described above, accurate corresponding points are found from designated corresponding points when pasting together a plurality of images, and affine coefficients are obtained on the basis of the corresponding points found. As a result, the burden of the operator when designating the corresponding points is alleviated. Furthermore, by providing means for correcting corresponding points having large offsets, it is possible to obtain a merged image having a high quality.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

display means for displaying first and second images;

designating means for designating a first point on the first image and a second on the second image, the second point corresponding to the first point;

acquiring means for acquiring a peripheral image of the first point in the first image, which has a first predetermined size;

determination means for determining a search zone in the second image, which includes the second point and has a second predetermined size;

searching means for searching an area having a maximum degree of coincidence with the peripheral image from the search zone;

correcting means for correcting a position of the second point based on the searched area; and merging means for merging the first and second images on the basis of the first point and the second point corrected by said correcting means.

2. The apparatus according to claim 1, wherein said designating means designates a plurality of pairs of corresponding points, each of the plurality of pairs consisting of a first point on the first image and a second point on the second image and said merging means merges the first and second images on the basis of the plurality of first points located on the first image and the plurality of second points located on the second image, which are corrected by said correcting means.

3. The apparatus according to claim 2, wherein said merging means merges the first and second images using an affine transformation.

4. The apparatus according to claim 1, wherein said correcting means moves the second point located on the second image within the search zone inclusive of the second point on the basis of the peripheral image of the first point, which is located on the first image.

5. The apparatus according to claim 4, wherein said searching means:

acquires a plurality of partial images, which have a size identical with that of the peripheral image, within said search zone; and extracts a partial image having a maximum degree of coincidence with the peripheral image from among the plurality of partial images.

6. The apparatus according to claim 5, wherein the degree of coincidence in said searching means is acquired on the basis of degree of correlation between the peripheral image and each of the partial images.

7. An image processing apparatus comprising:

display means for displaying first and second images;

designating means for designating a plurality of pairs of corresponding points, each of the plurality of pairs of corresponding points consisting of a first point on the first image and a second point on the second image;

acquiring means for acquiring, regarding each of the first points, a peripheral image which has a first predetermined size;

determination means for determining, regarding each of the second points, a search zone which includes the second point and having a second predetermined size;

searching means for searching an area having a maximum degree of coincidence with the peripheral image from the search zone;

correcting means for correcting a position of the second point based on the searched area; and merging means for merging the first and second image based on the first points and the second points corrected by said correction means.

8. The apparatus according to claim 7, wherein the degree of coincidence in said searching means is acquired on the basis of a degree of correlation between the peripheral image and each of partial images which has a size identical with that of the peripheral image, within the search zone.

9. The apparatus according to claim 8, wherein the first and second images are color images and the degree of coincidence between the partial image and a peripheral image is an average of degrees of coincidence acquired for each color component of the color image.

10. The apparatus according to claim 7, further comprising correcting means which, in a case where the plurality of pairs of corresponding points includes a pair for which the distance acquired by said acquisition means is greater than the predetermined value, is for correcting the position of the corresponding point, which is located on the first image, in such a manner that said distance becomes smaller than the predetermined value;

wherein operations performed by said moving means, said acquisition means and said merging means are re-executed using the corresponding point, which is located on the first image, corrected by said correcting means and the corresponding point designated on the second image.

11. The apparatus according to claim 10, wherein said correcting means includes:

second transforming means which, in a case where the plurality of pairs of corresponding points includes a pair for which the distance acquired by said acquisition means is greater than the predetermined value, is for obtaining a second transformed image by transforming the second image using a pair of corresponding points for which the distance acquired by said acquisition means is smaller than the predetermined value; and altering means for altering the position of the corresponding point located on the first image on the basis of the position of each corresponding point located on the second transformed image.

12. The apparatus according to claim 11, wherein said merging means merges the first and second images on the basis of finally obtained results of transformation by said second transformation means.

13. The apparatus according to claim 11, wherein said altering means moves the position of the corresponding point, which is located on the first image, of a pair of corresponding points among said plurality of pairs for which the distance acquired by said acquisition means is greater than the predetermined value, to position indicating a corresponding point, which is located on the second transformed image, forming the pair with the corresponding point located on the first image.

14. The apparatus according to claim 11, wherein said altering means moves all positions of corresponding points located on the first image to positions indicating corresponding points on the second transformed image.

15. The apparatus according to claim 11, wherein size of the prescribed range in said moving means is reduced whenever moving by said moving means is re-executed after operations of said second transformation means and altering means.

16. The apparatus according to claim 10, further comprising notification means which, in a case where the number of pairs of corresponding points for which the distances are smaller than the predetermined value is insufficient for executing the affine transformation in said second transformation means, gives notification to this effect.

17. The apparatus according to claim 10, wherein in a case where the number of pairs of corresponding points for which the distances are smaller than the predetermined value is insufficient for executing the affine transformation in said second transformation means, selection of a pair of corresponding points used in the affine transformation is performed based upon a value greater than the predetermined value.

18. An image processing method comprising:

a display step of displaying first and second images;

a designating step of designating a first point on the first image and a second point on the second image, the second point corresponding to the first point;

an acquiring step of acquiring a peripheral image of the first point in the first image, which has a first predetermined size;

a determination step of determining a search zone in the second image, which includes the second point and has a second predetermined size;

a searching step of searching an area having a maximum degree of coincidence with the peripheral image from the search zone;

a correcting step of correcting a position of the second point based on said searched area; and a merging step of merging the first and second images on the basis of the first point and the second point corrected by said correcting means.

19. The method according to claim 18, wherein said designating step designates a plurality of pairs of corresponding points, each of the plurality of pairs consisting of a first point on the first image and a second point on the second image and said merging step merges the first and second images on the basis of the plurality of first points located on the first image and the plurality of second points located on the second image, which are corrected at said correcting step.

20. The method according to claim 19, wherein said merging step merges the first and second images using an affine transformation.

21. The method according to claim 18, wherein said correcting step moves the second point located on the second image within the search zone inclusive of the second point on the basis of the peripheral image of the first point, which is located on the first image.

22. The method according to claim 21, wherein said searching step:

acquires a plurality of partial images, which have a size identical with that of the peripheral image, within said search zone; and extracts a partial image having a maximum degree of coincidence with the peripheral image from among the plurality of partial image.

23. The method according to claim 22, wherein the degree of coincidence at said searching step is acquired on the basis of degree of correlation between the peripheral image and each of the partial images.

24. An image processing method comprising:

a display step of displaying first and second images;

a designating step of designating a plurality of pairs of corresponding points, each of the plurality of pairs of corresponding points consisting of a first point on the first image and a second point on the second image;

an acquiring step of acquiring, regarding each of the first points, a peripheral image which has a first predetermined size;

a determination step of determining, regarding each of the second points, a search zone which includes the second point and has a second predetermined size;

a searching step of searching an area having a maximum degree of coincidence with the peripheral image from the search zone;

a correcting step of correcting a position of the second point based on the searched area; and a merging step of merging the first and second image based on the first points and the second points corrected by said correction means.

25. The method according to claim 24, wherein the degree of coincidence at said searching step is acquired on the basis of a degree of correlation between the peripheral image and each of partial images which has a size identical with that of the peripheral image, within the search zone.

26. The method according to claim 25, wherein the first and second images are color images and the degree of coincidence between the partial image and a peripheral image is an average of degrees of coincidence acquired for each color component of the color image.

27. The method according to claim 24, further comprising a correcting step which, in a case where the plurality of pairs of corresponding points includes a pair for which the distance acquired at said acquisition step is greater than the predetermined value, is for correcting the position of the corresponding point, which is located on the first image, in such a manner that said distance becomes smaller than the predetermined value;

wherein said moving step, said acquisition step and said merging step are re-executed using the corresponding point, which is located on the first image, corrected at said correcting step and the corresponding point designated on the second image.

28. The method according to claim 27, wherein said correcting step includes:

a second transforming step which, in a case where the plurality of pairs of corresponding points includes a pair for which the distance acquired by said acquisition means is greater than the predetermined value, is for obtaining a second transformed image by transforming the second image using a pair of corresponding points for which the distance acquired at said acquisition step is smaller than the predetermined value; and an altering step of altering the position of the corresponding point located on the first image on the basis of the position of each corresponding point located on the second transformed image.

29. The method according to claim 28, wherein said merging step merges the first and second images on the basis of finally obtained results of transformation at said second transformation step.

30. The method according to claim 28, wherein said altering step moves the position of the corresponding point, which is located on the first image, of a pair of corresponding points among said plurality of pairs for which the distance acquired at said acquisition step is greater than the predetermined value, to position indicating a corresponding point, which is located on the second transformed image, forming the pair with the corresponding point located on the first image.

31. The method according to claim 28, wherein said altering step moves all positions of corresponding points located on the first image to positions indicating corresponding points on the second transformed image.

32. The method according to claim 28, wherein size of the prescribed range at said moving step is reduced whenever said moving step is re-executed after operations at said second transformation step and altering step.

33. The method according to claim 27, further comprising a notification step which, in a case where the number of pairs of corresponding points for which the distances are smaller than the predetermined value is insufficient for executing the affine transformation at said second transformation step, gives notification to this effect.

34. The method according to claim 27, wherein in a case where the number of pairs of corresponding points for which the distances are smaller than the predetermined value is insufficient for executing the affine transformation at said second transformation step, selection of a pair of corresponding points used in the affine transformation is performed based upon a value greater than the predetermined value.

35. An image processing apparatus comprising:

display means for displaying first and second images;

designating means for designating a plurality of pairs of corresponding points indicating substantially corresponding positions on the first and second images;

transforming means for obtaining a transformed image by subjecting the second image to an affine transformation on the basis of the plurality of pairs of corresponding points designated by said designating means;

moving means for moving the corresponding points of the pairs located on the first image based upon peripheral images of respective corresponding points, which are located on the transformed image, forming the pairs with the corresponding points located on the first image, and with regard to each of the corresponding points, said moving means acquires a peripheral image of the corresponding point located on the transformed image, acquires a plurality of partial images, which have a size identical with that of the peripheral image, within a prescribed range of the corresponding point, which is located on the first image, forming the pair with the corresponding point located on the transformed image, extracts a partial image having a maximum degree of coincidence with the peripheral image from among the plurality of partial images, and moves the corresponding point, which is located on the first image, inside the partial image extracted, wherein the degree of coincidence in said moving means is acquired on the basis of a degree of correlation between the peripheral image and each of the partial images;

acquisition means for acquiring distances between the corresponding points located on the first image moved by said moving means and the corresponding points, which are located on the transformed image, forming the pairs with the corresponding points located on the first image; and merging means for merging the first and second image by the affine transformation, which is performed by said transformation means, in a case where all distances acquired by said acquisition means are smaller than a predetermined value, wherein the first and second images are color images and the degree of coincidence between the partial image and a peripheral image is an average of degrees of coincidence acquired for each color component of the color image.

36. An image processing apparatus comprising:

display means for displaying first and second images;

designating means for designating a plurality of pairs of corresponding points indicating substantially corresponding positions on the first and second images;

transforming means for obtaining a transformed image by subjecting the second image to an affine transformation on the basis of the plurality of pairs of corresponding points designated by said designating means;

moving means for moving the corresponding points of the pairs located on the first image based upon peripheral images of respective corresponding points, which are located on the transformed image, forming the pairs with the corresponding points located on the first image;

acquisition means for acquiring distances between the corresponding points located on the first image moved by said moving means and the corresponding points, which are located on the transformed image, forming the pairs with the corresponding points located on the first image;

merging means for merging the first and second image by the affine transformation, which is performed by said transformation means, in a case where all distances acquired by said acquisition means are smaller than a predetermined value; and correcting means which, in a case where the plurality of pairs of corresponding points includes a pair for which the distance acquired by said acquisition means is greater than the predetermined value, is for correcting the position of the corresponding point, which is located on the first image, in such a manner that the distance becomes smaller than the predetermined value, wherein operations performed by said moving means, said acquisition means and said merging means are re-executed using the corresponding point, which is located on the first image, corrected by said correcting means and the corresponding point designated on the second image.

37. An image processing method comprising:

a display step of displaying first and second images;

a designating step of designating a plurality of pairs of corresponding points indicating substantially corresponding positions on the first and second images;

a transforming step of obtaining a transformed image by subjecting the second image to an affine transformation on the basis of the plurality of pairs of corresponding points designated at said designating step;

a moving step of moving the corresponding points of the pairs located on the first image based upon peripheral images of respective corresponding points, which are located on the transformed image, forming the pairs with the corresponding points located on the first image, and with regard to each of the corresponding points, said moving step acquiring a peripheral image of the corresponding point located on the transformed image, acquiring a plurality of partial images, which have a size identical with that of the peripheral image, within a prescribed range of the corresponding point, which is located on the first image, forming the pair with the corresponding point located on the transformed image, extracting a partial image having a maximum degree of coincidence with the peripheral image from among the plurality of partial images, and moving the corresponding point, which is located on the first image, inside the partial image extracted, wherein the degree of coincidence at said moving step is acquired on the basis of degree of correlation between the peripheral image and each of the partial images;

an acquisition step of acquiring distances between the corresponding points located on the first image moved at said moving step and the corresponding points, which are located on the transformed image, forming the pairs with the corresponding points located on the first image; and a merging step of merging the first and second image by the affine transformation, which is performed at said transformation step, in a case where all distances acquired by said acquisition means are smaller than a predetermined value, wherein the first and second images are color images and the degree of coincidence between the partial image and a peripheral image is an average of degrees of coincidence acquired for each color component of the color image.

38. An image processing method comprising:

a display step of displaying first and second images;

a designating step of designating a plurality of pairs of corresponding points indicating substantially corresponding positions on the first and a second images;

a transforming step of obtaining a transformed image by subjecting the second image to an affine transformation on the basis of the plurality of pairs of corresponding points designated at said designating step;

a moving step of moving the corresponding points of the pairs located on the first image based upon peripheral images of respective corresponding points, which are located on the transformed image, forming the pairs with the corresponding points located on the first image;

an acquisition step of acquiring distances between the corresponding points located on the first image moved at said moving step and the corresponding points, which are located on the transformed image, forming the pairs with the corresponding points located on the first image;

a merging step of merging the first and second image by the affine transformation, which is performed at said transformation step, in a case where all distances acquired by said acquisition means are smaller than a predetermined value; and a correcting step which, in a case where the plurality of pairs of corresponding points includes a pair for which the distance acquired at said acquisition step is greater than the predetermined value, is for correcting the position of the corresponding point, which is located on the first image, in such a manner that the distance becomes smaller than the predetermined value, wherein said moving step, said acquisition step and said merging step are re-executed using the corresponding point, which is located on the first image, corrected at said correcting step and the corresponding point designated on the second image.

* * * * *

UNITED STATES PATENT AND TRADEMARK OFFICE
CERTIFICATE OF CORRECTION

PATENT NO. : 5,680,150

DATED : October 21, 1997

INVENTORS : YUKIHIKO SHIMUZU ET AL.

It is certified that error appears in the above-identified patent and that said Letters Patent is hereby corrected as shown below:

IN THE DRAWINGS

Sheet 4 of 8  Fig. 4 "SETP" should read --STEP--;
Sheet 8 of 8  Fig. 8 "SETP" should read --STEP--.

COLUMN 3

Line 3, "of" should read --of the--.

COLUMN 5 line 22, "in of" should read --in--;
line 55, "threshold" should read --the threshold--.

COLUMN 6 line 4, "in of" should read --in--;
line 13, ", updated" should read --updated--.

UNITED STATES PATENT AND TRADEMARK OFFICE
CERTIFICATE OF CORRECTION

PATENT NO. : 5,680,150

DATED : October 21, 1997

INVENTORS : YUKIHIKO SHIMIZU ET AL.

It is certified that error appears in the above-identified patent and that said Letters Patent is hereby corrected as shown below:

COLUMN 10 line 17, "position" should read --a position--.

COLUMN 12 line 27, "position" should read --a position--;
line 35, "size" should read --the size--.

COLUMN 14 line 59, "and a" should read --and--.

Signed and Sealed this

Seventh Day of July, 1998

BRUCE LEHMAN

Attest:

Attesting Officer

Commissioner of Patents and Trademarks